US012769829B2

United States Patent
(12) United States Patent
Tanaka et al.

(10) Patent No.: US 12,769,829 B2
(45) Date of Patent: Oct. 20, 2026

(54) INFORMATION PROCESSING DEVICE AND INFORMATION PROCESSING METHOD

(71) Applicant: MegaChips Corporation, Osaka (JP)

(72) Inventors: Ippei Tanaka, Osaka (JP); Hajime Yoshimura, Osaka (JP)

(73) Assignee: MEGACHIPS CORPORATION, Osaka (JP)

(*) Notice: Subject to any disclaimer, the term of this patent is extended or adjusted under 35 U.S.C. 154(b) by 34 days.

(21) Appl. No.: 19/073,117

(22) Filed: Mar. 7, 2025

(65) Prior Publication Data

US 2025/0291908 A1 Sep. 18, 2025

(30) Foreign Application Priority Data

Mar. 13, 2024 (JP) ................................ 2024-039276

(51) Int. Cl.
*G06F 21/00* (2013.01)
*G06F 21/55* (2013.01)

(52) U.S. Cl.
CPC ...... *G06F 21/554* (2013.01); *G06F 2221/034* (2013.01)

(58) Field of Classification Search
None
See application file for complete search history.

(56) References Cited

U.S. PATENT DOCUMENTS

2003/0227398 A1* 12/2003 Chen ................ G11B 20/00086 341/59
2005/0140532 A1* 6/2005 Rubin ................. H03M 1/1095 341/141
2013/0134296 A1* 5/2013 Hagihara ................ H03M 1/14 341/158

(Continued)

FOREIGN PATENT DOCUMENTS

JP H11-008616 A 1/1999

OTHER PUBLICATIONS

Zhang, Zuodong et al. Circuit Reliability Comparison Between Stochastic Computing and Binary Computing. IEEE Transactions on Circuits and Systems II: Express Briefs, vol. 67, Issue: 12. https://ieeexplore.ieee.org/stamp/stamp.jsp?tp=&arnumber=9090288 (Year: 2020).*

(Continued)

*Primary Examiner* — Jeremiah L Avery
(74) *Attorney, Agent, or Firm* — XSENSUS LLP

(57) ABSTRACT

A control circuit executes; processing a plurality of bits constituting confidential information one after another, each of the bits being a processing target bit; causing a calculation circuit to execute a first calculation by a first calculation circuit and a second calculation by a second calculation circuit when the processing target bit has a logic value of "1"; and causing the calculation circuit to execute only the second calculation of the first calculation and the second calculation when the processing target bit has a value of "0". A counter circuit outputs a counter value based on the (Continued)

number of processing target bits subjected to only the second calculation of the first calculation and the second calculation by the calculation circuit. A comparison circuit compares the counter value with an expected value for the counter value based on the confidential information.

20 Claims, 17 Drawing Sheets

(56) References Cited

U.S. PATENT DOCUMENTS

| | | | | |
|---|---|---|---|---|
| 2016/0070909 | A1* | 3/2016 | Loubet Moundi | G06F 21/55 726/23 |
| 2019/0205244 | A1* | 7/2019 | Smith | G06F 3/065 |
| 2021/0311640 | A1* | 10/2021 | Elad | G06F 3/0619 |
| 2023/0187922 | A1* | 6/2023 | Randazzo | H02H 1/0007 361/87 |
| 2024/0080193 | A1* | 3/2024 | Sandberg | H04L 9/32 |

OTHER PUBLICATIONS

Jain, Abhishek et al. Radiation Tolerant Multi-Bit Flip-Flop System With Embedded Timing Pre-Error Sensing. IEEE Journal of Solid-State Circuits, vol. 57, Issue: 9. https://ieeexplore.ieee.org/stamp/stamp.jsp?tp=&arnumber=9718587 (Year: 2022).*

Inoue, Michiko et al. Partial Scan Approach for Secret Information Protection. 2009 14th IEEE European Test Symposium. https://ieeexplore.ieee.org/stamp/stamp.jsp?tp=&arnumber=5170472 (Year: 2009).*

* cited by examiner

FIG.6

| BIT POSITION | 0 | 1 | 2 | 3 | 4 | 5 | 6 | 7 | . . . |
|---|---|---|---|---|---|---|---|---|---|
| WEIGHT VALUE | 1 | 2 | 3 | 4 | 5 | 6 | 7 | 8 | |

FIG.8

| BIT POSITION | 0 | 1 | 2 | 3 | 4 | 5 | 6 | 7 | . . . |
|---|---|---|---|---|---|---|---|---|---|
| WEIGHT VALUE | $2^0$ | $2^1$ | $2^2$ | $2^3$ | $2^4$ | $2^5$ | $2^6$ | $2^7$ | |

FIG.11

| | | | | | | | | | | | | | | | | |
|---|---|---|---|---|---|---|---|---|---|---|---|---|---|---|---|---|
| R1 | 1 | 0 | 0 | 0 | 0 | 0 | 0 | 0 | 0 | 1 | 0 | 0 | 0 | 0 | 0 | 1 |
| R2 | 0 | 0 | 0 | 1 | 0 | 0 | 0 | 0 | 0 | 0 | 1 | 0 | 0 | 0 | 0 | 0 |
| R3 | 0 | 0 | 0 | 0 | 1 | 0 | 0 | 0 | 0 | 0 | 0 | 1 | 0 | 0 | 0 | 0 |
| R4 | 0 | 0 | 0 | 0 | 0 | 1 | 0 | 0 | 0 | 0 | 0 | 0 | 1 | 0 | 0 | 0 |

FIG.14

| | | | | | | | | | |
|---|---|---|---|---|---|---|---|---|---|
| NUMBER OF PROCESSES | 1 | 2 | 3 | 4 | 5 | 6 | 7 | 8 | . . . |
| SHIFT WIDTH | 1 | 2 | 3 | 4 | 5 | 6 | 7 | 8 | |

FIG.15

| NUMBER OF PROCESSES | 1 | 2 | 3 | 4 | 5 | 6 | 7 | 8 | . . . |
|---|---|---|---|---|---|---|---|---|---|
| POINT ADDITION VALUE | 1G | 2G | 3G | 4G | 5G | 6G | 7G | 8G | |

INFORMATION PROCESSING DEVICE AND INFORMATION PROCESSING METHOD

CROSS-REFERENCE TO RELATED APPLICATION

The present application claims priority of Japanese patent application JP 2024-039276, filed on Mar. 13, 2024, the entire content of which is incorporated herein by reference in its entirety.

FIELD OF INVENTION

The present invention relates to an information processing device and an information processing method.

BACKGROUND ART

The development of the IoT technology in recent years has allowed various information processing devices to be connected to networks. In this regard, a threat level of steal of confidential information from such an information processing device has increased due to a physical attack to the information processing device. One example of the physical attack is a fault attack (hereinafter, abbreviated as "FA"). The FA means an attack of steeling confidential information by physically stimulating the information processing device in execution of processing the confidential information, intentionally inducing a miscalculation, and analyzing a behavior in the miscalculation.

Japanese Unexamined Patent Publication No. HEI 11-8616 discloses an IC card provided with an FA countermeasure according to a background art. A coprocessor mounted on the IC card stores, in a signature generation process employing the Rivest-Shamir-Adleman cryptosystem (RSA) which is one of public-key cryptosystems, data generated in a calculation, and simultaneously calculates and stores an error detection code associated with the data. The coprocessor recalculates an error detection code associated with the data at generation of a digital signature for collation with the stored error detection code.

A "Safe Error Attack" has been known as a kind of the FA. The Safe Error Attack aims at stealing confidential information by analyzing a possible change in a final output through an error injection into each bit constituting the confidential information. The background art disclosed in Japanese Unexamined Patent Publication No. HEI 11-8616 is unsatisfactory as an FA countermeasure in terms of a failure at preventing the steal of the confidential information by the Safe Error Attack.

The way called "Exponent Blinding" being another FA countermeasure conceals the confidential information with a random number. However, this way requires generation of the random number and encryption of the confidential information with the generated random number, and thus complicates relevant processing.

SUMMARY OF THE INVENTION

The present invention has an object of providing an information processing device and an information processing method for an enhanced FA countermeasure by a simple way.

An information processing device according to a first feature of the present invention includes: a calculation circuit that includes a first calculation circuit and a second calculation circuit; a control circuit; a counter circuit; and a comparison circuit. The control circuit executes; processing a plurality of bits constituting confidential information one after another, each of the bits being a processing target bit; causing the calculation circuit to execute a first calculation by the first calculation circuit and a second calculation by the second calculation circuit when the processing target bit has a logic value of "1"; and causing the calculation circuit to execute only the second calculation of the first calculation and the second calculation when the processing target bit has a value of "0". The counter circuit outputs a counter value based on the number of processing target bits subjected to only the second calculation of the first calculation and the second calculation by the calculation circuit. The comparison circuit compares the counter value with an expected value for the counter value based on the confidential information.

The first feature enables detection of an FA from disagreement between the counter value and the expected value. As a result, simple comparison of the counter value with the expected value by the comparison circuit achieves an enhanced FA countermeasure.

In the information processing device according to a second feature of the present invention, in the first feature, the calculation circuit serves as a modular exponentiation calculation circuit, the first calculation circuit serves as a multiplication circuit, and the second calculation circuit serves as a squared calculation circuit.

The second feature enables facilitated detection of an FA aimed at attacking the modular exponentiation calculation circuit.

In the information processing device according to a third feature of the present invention, in the first feature, the calculation circuit serves as a scalar multiplication circuit defined on the basis of an elliptic curve, the first calculation circuit serves as a point addition circuit, and the second calculation circuit serves as a point doubling circuit.

The third feature enables facilitated detection of an FA aimed at attacking the scalar multiplication circuit.

In the information processing device according to a fourth feature of the present invention, in the first feature, the first calculation circuit and the second calculation circuit are commonly constituted by the calculation circuit configured to selectively execute the first calculation and the second calculation by switching therebetween.

In the fourth feature, the first calculation circuit and the second calculation circuit are commonly constituted by the calculation circuit, and thus, the configuration achieves a smaller circuit scale than a circuit scale in a configuration including independent circuits respectively for the first and second calculation circuits.

In the information processing device according to a fifth feature of the present invention, in any one of the first to fourth features, the counter value indicates a total number of processing target bits subjected to only the second calculation of the first calculation and the second calculation by the calculation circuit.

The fifth feature enables detection of an FA by simply comparing the total number of processing target bits subjected to only the second calculation of the first calculation and the second calculation with the expected value.

In the information processing device according to a sixth feature of the present invention, in any one of the first to fourth features, the counter value indicates a total of weight values each associated with a bit position of each of the processing target bits subjected to only the second calculation of the first calculation and the second calculation by the calculation circuit.

Even when the number of processing target bits each having the logic value of "1" flipped from "0" due to an error injection equals to the number of processing target bits each having the logic value of "0" flipped from "1" due to an error injection, the sixth feature achieves improvement in accuracy of detecting an FA.

In the information processing device according to a seventh feature of the present invention, in any one of the first to fourth features, the counter value includes; a first counter value indicating a total number of processing target bits subjected to only the second calculation of the first calculation and the second calculation by the calculation circuit; and a second counter value indicating a total of weight values each associated with a bit position of each of the processing target bits subjected to only the second calculation of the first calculation and the second calculation by the calculation circuit.

Even when the first counter value agrees with the expected value for the first counter value in association with each bit position or the number of bits concerning an error injection, the seventh feature enables detection of an FA with reference to a difference between the second counter value and an expected value for the second counter value. Similarly, even when the second counter value agrees with the expected value for the second counter value in association with each bit position or the number of bits concerning an error injection, the seventh feature enables detection of the FA with reference to a difference between the first counter value and an expected value for the first counter value. As a result, the FA is detectable with higher accuracy.

In the information processing device according to an eighth feature of the present invention, in the sixth or seventh feature, the bits include k-bits with a $0^{th}$ bit defined as a least significant bit and a $(k-1)^{th}$ bit defined as a most significant bit, and a weight value at a bit position of an $n^{th}$ bit is $2^n$, "n" being an integer of 0 or more to (k−1) or less.

Even when the number of processing target bits each having the logic value of "1" flipped from "0" due to an error injection equals to the number of processing target bits each having the logic value of "0" flipped from "1" due to an error injection, the eighth feature achieves high accuracy of detection of an FA. Further, setting the weight value to "$2^n$" leads to achievement in update of the counter value by a simple combination of a bit shift and an exclusive-OR way.

In the information processing device according to a ninth feature of the present invention, in the eighth feature, the counter circuit includes a plurality of registers, and the counter circuit distributes and stores the counter value in the registers in emergence order of the processing target bits subjected to only the second calculation of the first calculation and the second calculation by the calculation circuit.

The ninth feature achieves a reduction in the amount of information in each of the registers and prevention of leakage of the confidential information from the counter circuit by distributing and storing the counter value in the registers.

The information processing device according to a tenth feature of the present invention further includes, in the eighth feature, a setting circuit that sets an initial value for the counter value with a random number.

The tenth feature enables concealment of the counter value by setting an initial value for the counter value with the random number. As a result, the feature enables prevention of leakage of the confidential information from the counter circuit. The feature further achieves the prevention at a lower cost than a cost incurring in a configuration of concealing the confidential information itself with a random number.

In the information processing device according to an eleventh feature of the present invention, in any one of the first to tenth features, the counter circuit updates the counter value through a calculation by the first calculation circuit when the processing target bit has the logic value of "0".

The eleventh feature enables execution of the calculation by the first calculation circuit even when the processing target bit has the value of "0", and thus achieves SPA resistance.

In the information processing device according to a twelfth feature of the present invention, in the eleventh feature, the counter circuit executes a bit shift of the counter value when the calculation circuit executes only the second calculation of the first calculation and the second calculation, and the counter value indicates a total number of the bit shift.

The twelfth feature enables detection of an FA by simply comparing the number of digits of the expected value with the number of digits of the counter value.

In the information processing device according to a thirteenth feature of the present invention, in the twelfth feature, the bit shift has a shift width depending on the number of times of the processing target bits have been processed.

Even when the number of processing target bits each having the logic value "1" flipped from "0" due to an error injection equals to the number of processing target bits each having the logic value of "0" flipped from "1" due to an error injection, the thirteenth feature achieves improvement in accuracy of detecting an FA.

In the information processing device according to a fourteenth feature of the present invention, in the twelfth feature, the bit shift has a shift width depending on the number of repetitions of the value of target bits subjected to the first calculation and the second calculation by the calculation circuit before the processing target bits subjected to only the second calculation of the first calculation and the second calculation by the calculation circuit.

Even when the number of processing target bits each having the logic value of "1" flipped from "0" due to an error injection equals to the number of processing target bits each having the logic value of "0" flipped from "1" due to an error injection, the fourteenth feature achieves improvement in accuracy of detecting an FA.

In the information processing device according to a fifteenth feature of the present invention, in the eleventh feature, the counter circuit executes a point addition calculation of adding the counter value when the calculation circuit executes only the second calculation of the first calculation and the second calculation, and the counter value indicates coordinate of a point.

The fifteenth feature enables detection of an FA by simply comparing a point coordinate of an expected value with a point coordinate of a counter value.

In the information processing device according to a sixteenth feature of the present invention, in the fifteenth feature, the number of point addition calculations depends on the number of times of the processing target bits have been processed.

Even when the number of processing target bits each having the logic value of "1" flipped from "0" due to an error injection equals to the number of processing target bits each having the logic value of "0" flipped from "1" due to an error injection, the sixteenth feature achieves improvement in accuracy of detecting an FA.

An information processing method according to a seventeenth feature of the present invention includes: by an information processing device, acquiring confidential information constituted by a plurality of bits; processing the bits one after another, each of the bits being a processing target bit; executing a first calculation and a second calculation when the processing target bit has a logic value of "1"; executing only the second calculation of the first calculation and the second calculation when the processing target bit has a logic value of "0"; counting a counter value based on the number of processing target bits subjected to only the second calculation of the first calculation and the second calculation; and comparing the counter value with an expected value for the counter value based on the confidential information.

The seventeenth feature enables detection of an FA from disagreement between the counter value and the expected value. As a result, simple comparison of the counter value with the expected value by the comparison circuit achieves an enhanced FA countermeasure.

BRIEF DESCRIPTION OF THE DRAWINGS

FIG. 6 is a table showing a simplified example setting of weight values.

FIG. 8 is a table showing a simplified example setting of weight values.

FIG. 11 is an illustration of simplified example counter values of registers.

FIG. 14 is a table showing a simplified example setting of shift widths.

FIG. 15 is a table showing a simplified example setting of point addition values.

DETAILED DESCRIPTION

Figure 1:
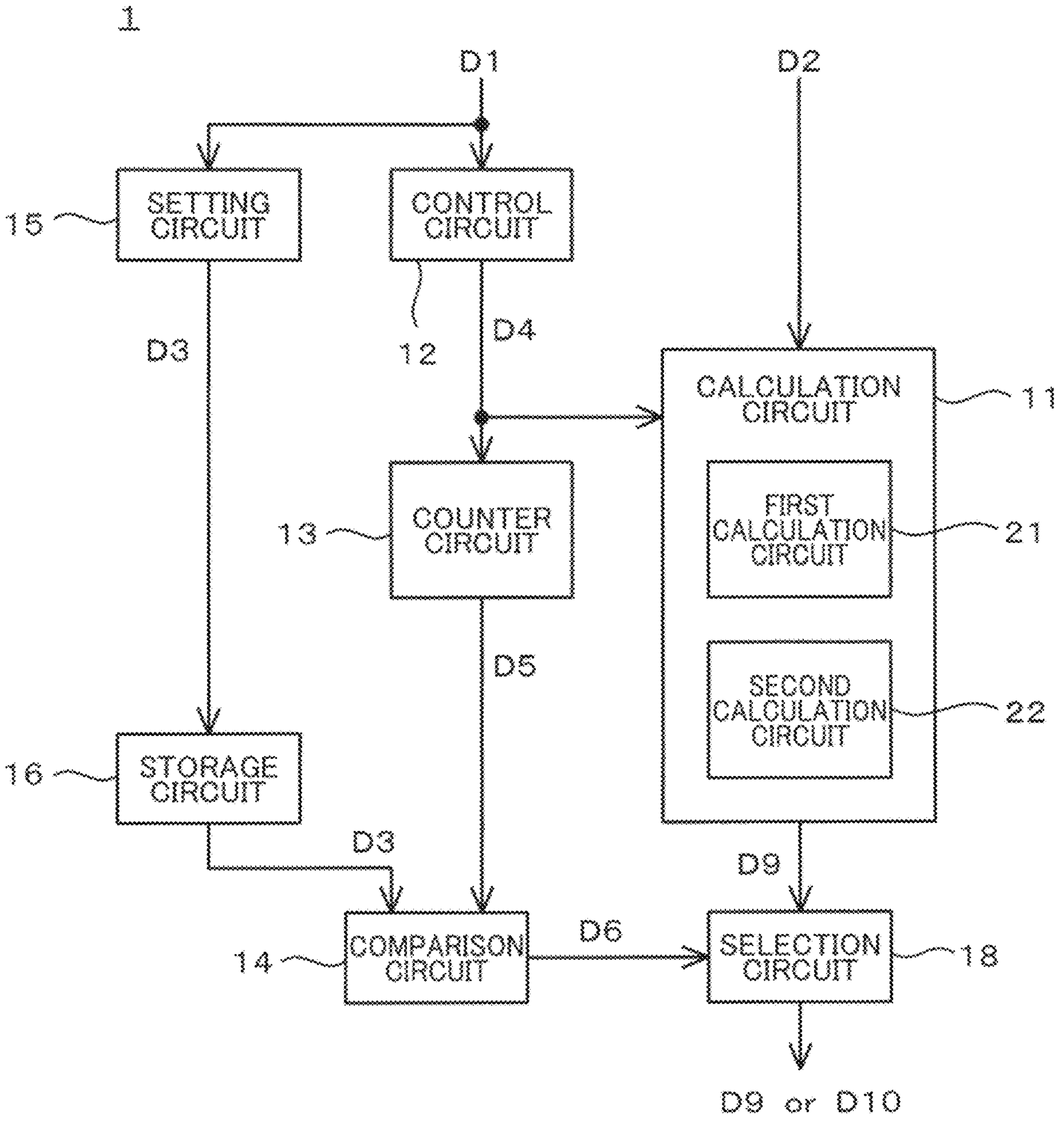
FIG. 1 is a diagram showing a simplified configuration of an information processing device according to an embodiment of the present invention.

Hereinafter, an embodiment of the present invention will be described with reference to the accompanying drawings. The elements given the same reference numerals in different drawings are defined to be the same or corresponding elements.

FIG. 1 is a diagram showing a simplified configuration of an information processing device 1 according to an embodiment of the present invention. The information processing device 1 includes a calculation circuit 11, a control circuit 12, a counter circuit 13, a comparison circuit 14, a setting circuit 15, a storage circuit 16, and a selection circuit 18. The calculation circuit 11 includes a first calculation circuit 21 and a second calculation circuit 22.

Figure 2:
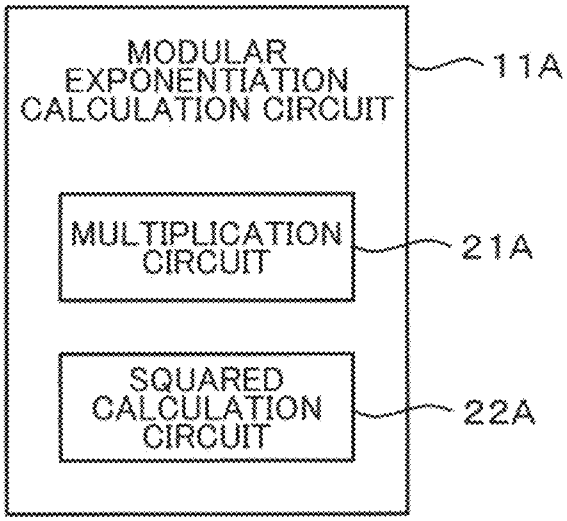
FIG. 2 is a diagram showing an example first configuration of a calculation circuit.

FIG. 2 is a diagram showing an example first configuration of the calculation circuit 11. In the example first configuration, the calculation circuit 11 serves as a modular exponentiation calculation circuit 11A, the first calculation circuit 21 serves as a multiplication circuit 21A, and the second calculation circuit 22 serves as a squared calculation circuit 22A. The example first configuration represents adoption of the information processing device 1 for an RSA cryptography included in a public-key cryptography. The multiplication circuit 21A and the squared calculation circuit 22A may be constituted by independent circuits respectively, or may be commonly constituted by a circuit configured to selectively execute a multiplication calculation and a squared calculation by switching therebetween in accordance with an input of a control parameter. In the RSA cryptography, a calculation cost for the modular exponentiation calculation is dominant and critical. The modular exponentiation calculation circuit 11A executes the modular exponentiation calculation at a high speed by employing a "binary exponentiation way". The information processing device 1 may be adopted for a specific public-key cryptography without limitation to the RSA cryptography.

Figure 3:
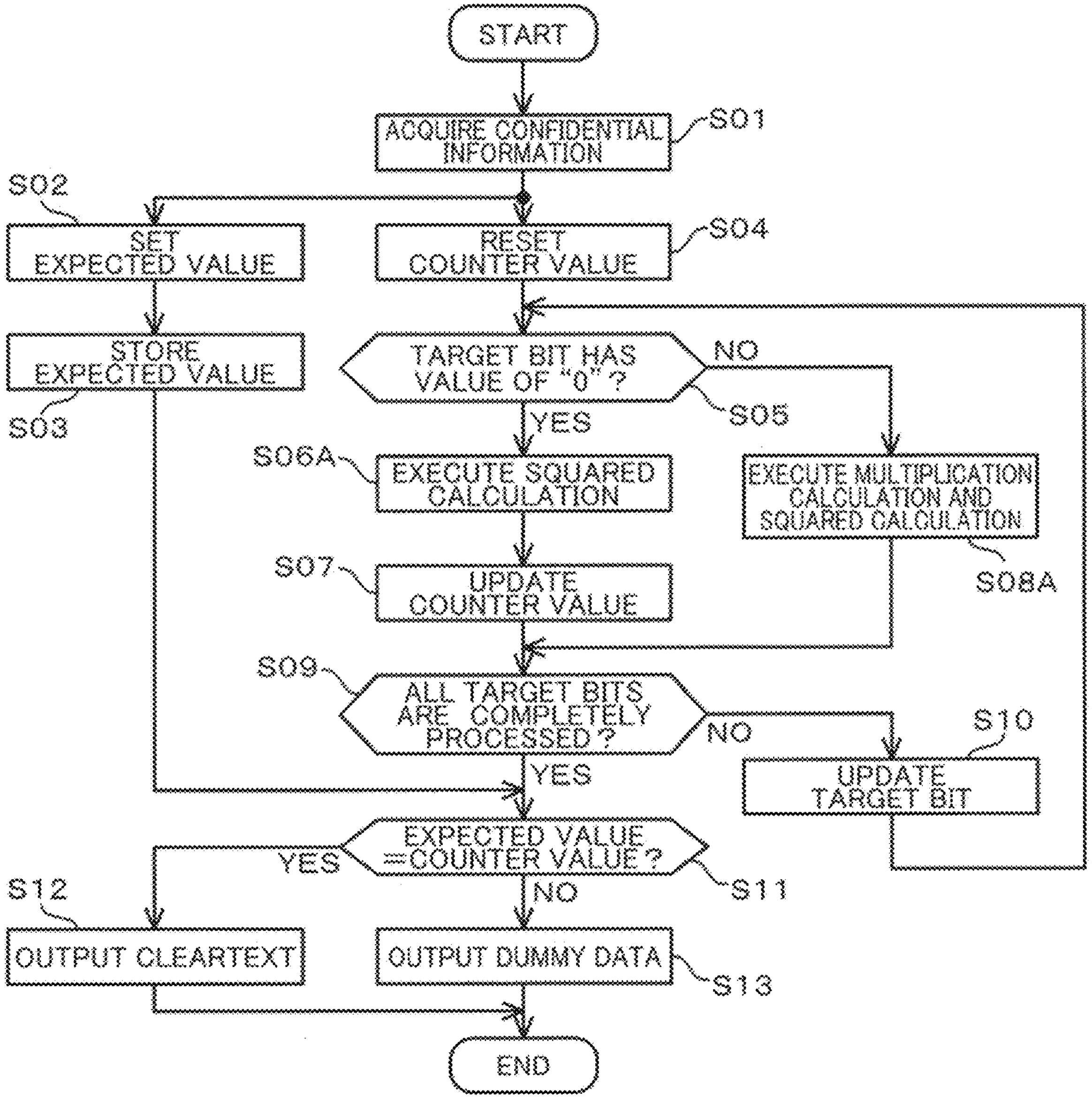
FIG. 3 is a flowchart showing a process executed by the information processing device concerning the example first configuration.

FIG. 3 is a flowchart showing a process executed by the information processing device 1 concerning the example first configuration.

First, in step S01, the information processing device 1 acquires confidential information D1. The confidential information D1 may include a secret key constituted by a plurality of k-bits and showing a value of a power exponent. The numeral of "k" is, for example, "2048", but is not limited thereto. Each bit constituting the confidential information D1 has a value of "0" or "1" in a binary system or two-valued logic. The information processing device 1 further acquires a ciphertext D2. The ciphertext D2 may include data encrypted by a public key or other way. The confidential information D1 is input into the control circuit 12 and the setting circuit 15. The ciphertext D2 is input into the modular exponentiation calculation circuit 11A. The modular exponentiation calculation circuit 11A has a T-register (not shown) that stores a variable T and an S-register (not shown) that stores a variable S. The modular exponentiation calculation circuit 11A stores the ciphertext D2 in the T-register and stores an initial value "1" in the S-register.

Next, in step S02, the setting circuit 15 sets an expected value D3 on the basis of the confidential information D1. In the example in the embodiment, the setting circuit 15 sets, as the expected value D3, a total number of bits each having a logic value of "0" or a logic zero among the k-bits constituting the confidential information D1.

Subsequently, in step S03, the setting circuit 15 stores the expected value D3 set in step S02 in the storage circuit 16.

In step S04 that is subsequent to step S01, the counter circuit 13 resets a counter value to an initial value. In the example in the embodiment, the initial value is "0".

The control circuit 12 processes the k-bits constituting the confidential information D1 one after another, each of the bits being a processing target (hereinafter, abbreviated as a "target bit" as well). In the example in the embodiment, the information processing device 1 executes a modular exponentiation calculation by employing a "rightward binary exponentiation way". The rightward binary exponentiation way includes processing the k-bits one after another rightward from the most significant bit to the least significant bit of the k-bits. The information processing device 1 may execute a modular exponentiation calculation by employing a "leftward binary exponentiation way". The leftward binary exponentiation way includes processing the k-bits one after another leftward from the least significant bit to the most significant bit of the k-bits.

Next, in step S05, the control circuit 12 determines whether the target bit has the logic value of "0". The control circuit 12 inputs a control signal D4 associated with the logic value of the target bit into the modular exponentiation calculation circuit 11A. The control signal D4 is input into the counter circuit 13 as well.

When the target bit has a logic value of "1" or a logic one (No in step S05), the control circuit 12 causes, in step S08A, the modular exponentiation calculation circuit 11A to execute a multiplication calculation by the multiplication circuit 21A, that is, the first calculation by the first calculation circuit 21, and a squared calculation by the squared calculation circuit 22A, that is, the second calculation by the second calculation circuit 22, in accordance with a control signal D4 showing the logic value of "1".

The multiplication calculation and the squared calculation included in the modular exponentiation calculation is expressed by the following formulas with a modulo p and variables S, T.

$$ST \bmod p \qquad \text{Multiplication calculation:}$$

$$T^2 \bmod p \qquad \text{Squared calculation:}$$

The multiplication circuit 21A stores a value resulting from the multiplication calculation in the S-register. The squared calculation circuit 22A stores a value resulting from the squared calculation in the T-register.

In contrast, when the target bit has the logic value of "0" (YES in step S05), the control circuit 12 causes, in step S06A, the modular exponentiation calculation circuit 11A to execute only the squared calculation by the squared calculation circuit 22A of the multiplication calculation by the multiplication circuit 21A and the squared calculation by the squared calculation circuit 22A in accordance with a control signal D4 showing the logic value of "0".

The squared calculation circuit 22A stores a value resulting from the squared calculation in the T-register.

Further, the counter circuit 13 updates, in step S07, a counter value D5 when the control signal D4 shows the logic value of "0", that is, when the modular exponentiation calculation circuit 11A executes only the squared calculation by the squared calculation circuit 22A of the multiplication calculation by the multiplication circuit 21A and the squared calculation by the squared calculation circuit 22A. In the example in the embodiment, the counter circuit 13 increments the counter value D5 by "1", i.e., one by one, in accordance with every control signal D4 showing the logic value of "0". The counter circuit 13 avoids updating the counter value D5 when the control signal D4 shows the logic value of "1", that is, when the modular exponentiation calculation circuit 11A executes both the multiplication calculation by the multiplication circuit 21A and the squared calculation by the squared calculation circuit 22A. The counter circuit 13 outputs the counter value D5. The counter value D5 is input into the comparison circuit 14.

In step S09 that is subsequent to step S07 or step S08A, the information processing device 1 determines whether all the k-bits defined to be target bits are completely processed.

When a target bit to be processed is present (NO in step S09), the information processing device 1 updates, in step S10, the target bit by a rightward bit shift by one bit. The information processing device 1 repeatedly executes step S05 and subsequent steps thereafter for a new target bit after the update.

When all the target bits are completely processed (YES in step S09), the comparison circuit 14 compares the expected value D3 from the storage circuit 16 with the counter value D5 from the counter circuit 13, and determines whether the expected value D3 and the counter value D5 agree with each other in step S11. In a case where the logic value associated with the control signal D4 is flipped by an FA aimed at the modular exponentiation calculation circuit 11A, the counter value D5 disagrees with the expected value D3. In this manner, the FA is detectable. The comparison circuit 14 outputs data D6 showing a result of the comparison. The data D6 is input into the selection circuit 18.

When the expected value D3 and the counter value D5 agree with each other (YES in step S11), the modular exponentiation calculation circuit 11A outputs data D9 showing a result of the calculation and the selection circuit 18 outputs the data D9 in step S12. The data D9 includes data of a cleartext decrypted from the ciphertext D2.

When the expected value D3 and the counter value D5 disagree with each other (NO in step S11), the selection circuit 18 outputs dummy data D10 in step S13. The dummy data D10 is irrelevant to the ciphertext D2. Alternatively, another error handling way may be adopted in place of the way of outputting the dummy data D10, such as a way of outputting an alert or a way of avoiding outputting any data.

Figure 4:
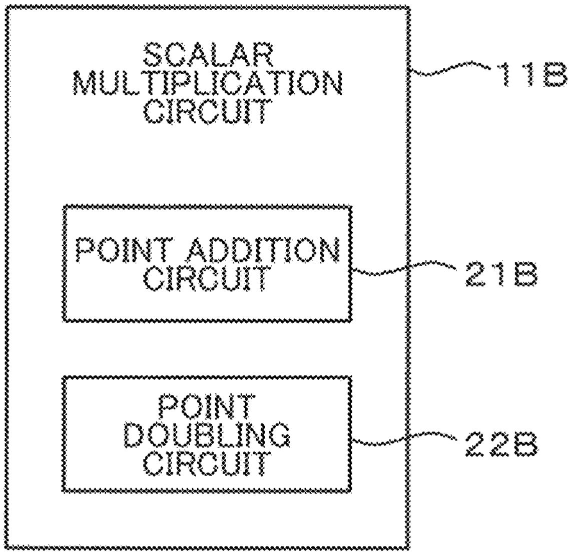
FIG. 4 is a diagram showing an example second configuration of the calculation circuit.

FIG. 4 is a diagram showing an example second configuration of the calculation circuit 11. In the example second configuration, the calculation circuit 11 serves as a scalar multiplication circuit 11B, the first calculation circuit 21 serves as a point addition circuit 21B, and the second calculation circuit 22 serves as a point doubling circuit 22B. The example second configuration represents adoption of the information processing device 1 for an elliptic curve cryptography included in the public-key cryptography. The point addition circuit 21B and the point doubling circuit 22B may be constituted by independent circuits respectively, or may be commonly constituted by a circuit configured to selectively execute a point addition calculation and a point doubling calculation by switching therebetween in accordance with an input of a control parameter. In the elliptic curve cryptography, a calculation cost for a scalar multiplication calculation defined on the basis of an elliptic curve is dominant and critical. The scalar multiplication circuit 11B executes the scalar multiplication calculation at a high speed by employing the binary exponentiation way.

Figure 5:
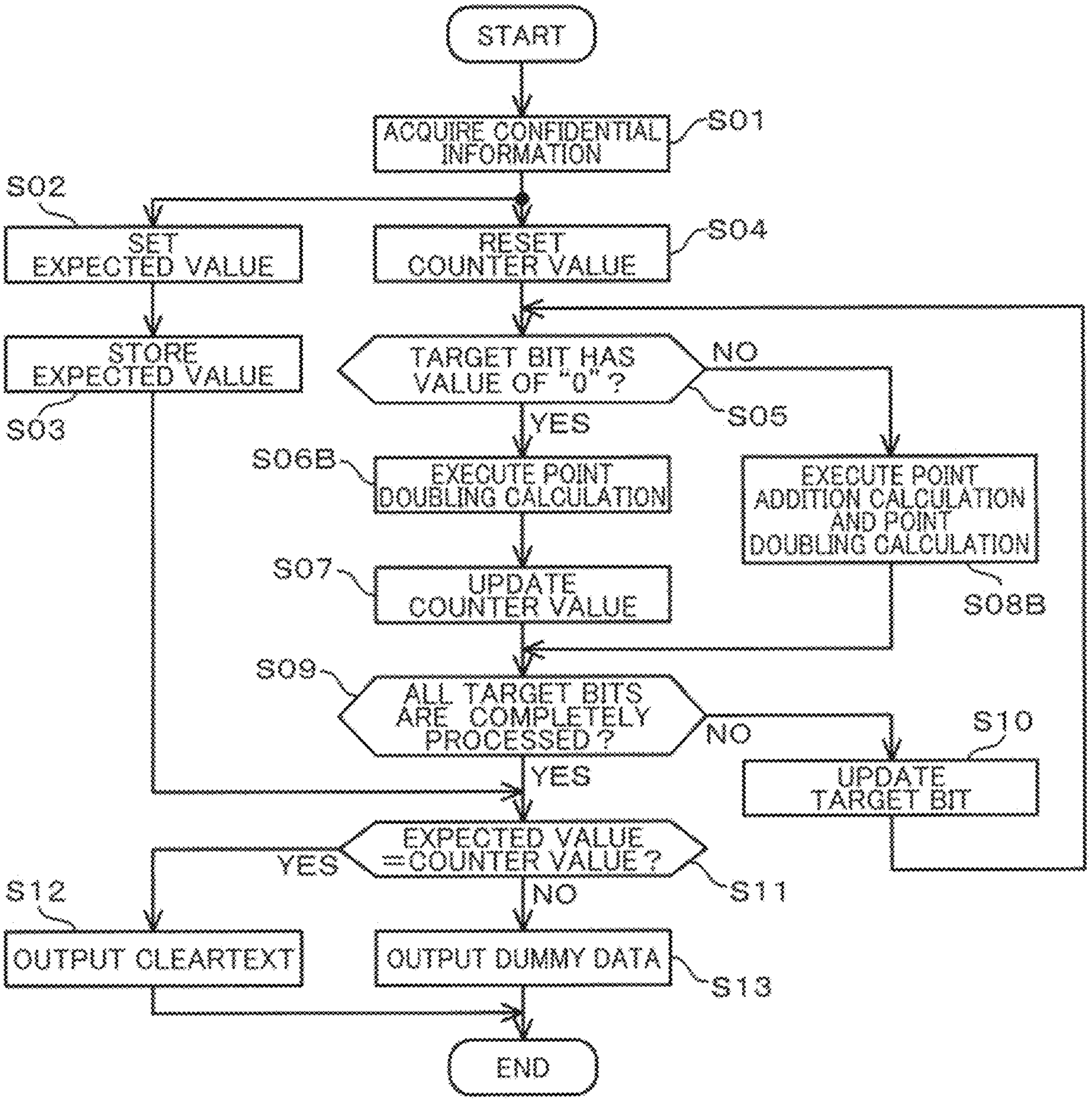
FIG. 5 is a flowchart showing a process executed by the information processing device concerning the example second configuration.

FIG. 5 is a flowchart showing a process executed by the information processing device 1 concerning the example second configuration. Hereinafter, differences from the flowchart shown in FIG. 3 will be described.

In step S01, the information processing device 1 acquires confidential information D1. The confidential information D1 may include a secret key constituted by a plurality of k-bits and showing a scalar value. The numeral of "k" is, for example, "256", but is not limited to thereto.

In step S02, the setting circuit 15 sets an expected value D3 on the basis of the confidential information D1.

In step S03, the setting circuit 15 stores the expected value D3 set in step S02 in the storage circuit 16.

In step S04, the counter circuit 13 resets a counter value to an initial value.

In step S05, the control circuit 12 determines whether a target bit has the logic value of "0".

When the target bit has the logic value of "1" (No in step S05), the control circuit 12 causes, in step S08B, the scalar multiplication circuit 11B to execute a point addition calculation by the point addition circuit 21B, that is, the first calculation by the first calculation circuit 21A, and a point doubling calculation by the point doubling circuit 22B, that is, the second calculation by the second calculation circuit 22, in accordance with a control signal D4 showing the logic value of "1". The point addition calculation in the scalar multiplications means addition of points on the elliptic curve. The point doubling calculation in the scalar multiplication means doubling calculation of points on the elliptic curve.

In contrast, when the target bit has the logic value of "0" (Yes in step S05), the control circuit 12 causes, in step S06B, the scalar multiplication circuit 11B to execute only the point doubling calculation by the point doubling circuit 22B of the point addition calculation by the point addition circuit 21B and the point doubling calculation by the point doubling circuit 22B in accordance with a control signal D4 showing the logic value of "0".

The counter circuit 13 updates, in step S07, a counter value D5 when the control signal D4 shows the logic value of "0", that is, when the scalar multiplication circuit 11B executes only the point doubling calculation by the point doubling circuit 22B of the point addition calculation by the point addition circuit 21B and the point doubling calculation by the point doubling circuit 22B. In the example in the embodiment, the counter circuit 13 increments the counter value D5 by "1", i.e., one by one, in accordance with every control signal D4 showing the logic value of "0". The counter circuit 13 avoids updating the counter value D5 when the control signal D4 shows the logic value of "1", that is, when the scalar multiplication circuit 11B executes both the point addition calculation by the point addition circuit 21B and the point doubling calculation by the point doubling circuit 22B. The counter circuit 13 outputs the counter value D5. The counter value D5 is input into the comparison circuit 14.

In step S09 that is subsequent to step S07 or step S08B, the information processing device 1 determines whether all the k-bits defined to be target bits are completely processed.

When a target bit to be processed is present (NO in step S09), the information processing device 1 updates, in step S10, the target bit by a rightward bit shift by one bit.

When all the target bits are completely processed (YES in step S09), the comparison circuit 14 compares the expected value D3 from the storage circuit 16 with the counter value D5 from the counter circuit 13, and determines whether the expected value D3 and the counter value D5 agree with each other in step S11. The comparison circuit 14 outputs data D6 showing a result of the comparison. The data D6 is input into the selection circuit 18.

When the expected value D3 and the counter value D5 agree with each other (YES in step S11), the scalar multiplication circuit 11B outputs data D9 showing a result of the calculation and the selection circuit 18 outputs data D9 in step S12.

When the expected value D3 and the counter value D5 disagree with each other (NO in step S11), the selection circuit 18 outputs dummy data D10 in step S13.

The embodiment enables detection of an FA from disagreement between the counter value D5 and the expected value D3. As a result, simple comparison of the counter value D5 with the expected value D3 by the comparison circuit 14 achieves an enhanced countermeasure.

The embodiment further enables facilitated detection of an FA aimed at attacking the modular exponentiation calculation circuit 11A.

The embodiment additionally enables facilitated detection of an FA aimed at attacking the scalar multiplication circuit 11B.

The embodiment moreover enables detection of an FA by simply comparing the total number of processing target bits subjected to only the second calculation of the first calculation and the second calculation with the expected value D3.

Hereinafter, various modifications of the embodiment will be described.

First Modification

In the embodiment, the counter value D5 may indicate a total of weight values each associated with a bit position of each of processing target bits subjected to only the second calculation of the first calculation and the second calculation by the calculation circuit 11.

FIG. 6 is a table showing a simplified example setting of weight values. The weight values differ in association with a bit position of each processing target bit. For instance, a weight value of "1" is set for the $0^{th}$ bit (the least significant bit), and a weight value of "2" is set for the first bit, and a weight value of "3" is set for the second bit, the bits constituting confidential information D1.

A setting circuit 15 calculates, in accordance with a setting rule for weight values, an expected value D3 based on the confidential information D1. The expected value D3 indicates a total of weight values each associated with a bit position of each bit having the logic value of "0" among a plurality of bits constituting the confidential information D1.

Even when the number of processing target bits each having the logic value of "1" flipped from "0" due to an error injection equals to the number of processing target bits each having the logic value of "0" flipped from "1" due to an error injection, the modification achieves improvement in accuracy of detecting the FA.

Second Modification

In the first modification, the counter value may further include a counter value in the embodiment. Specifically, a counter value D5 may include a counter value in the embodiment and a counter value in the first modification.

Figure 7:
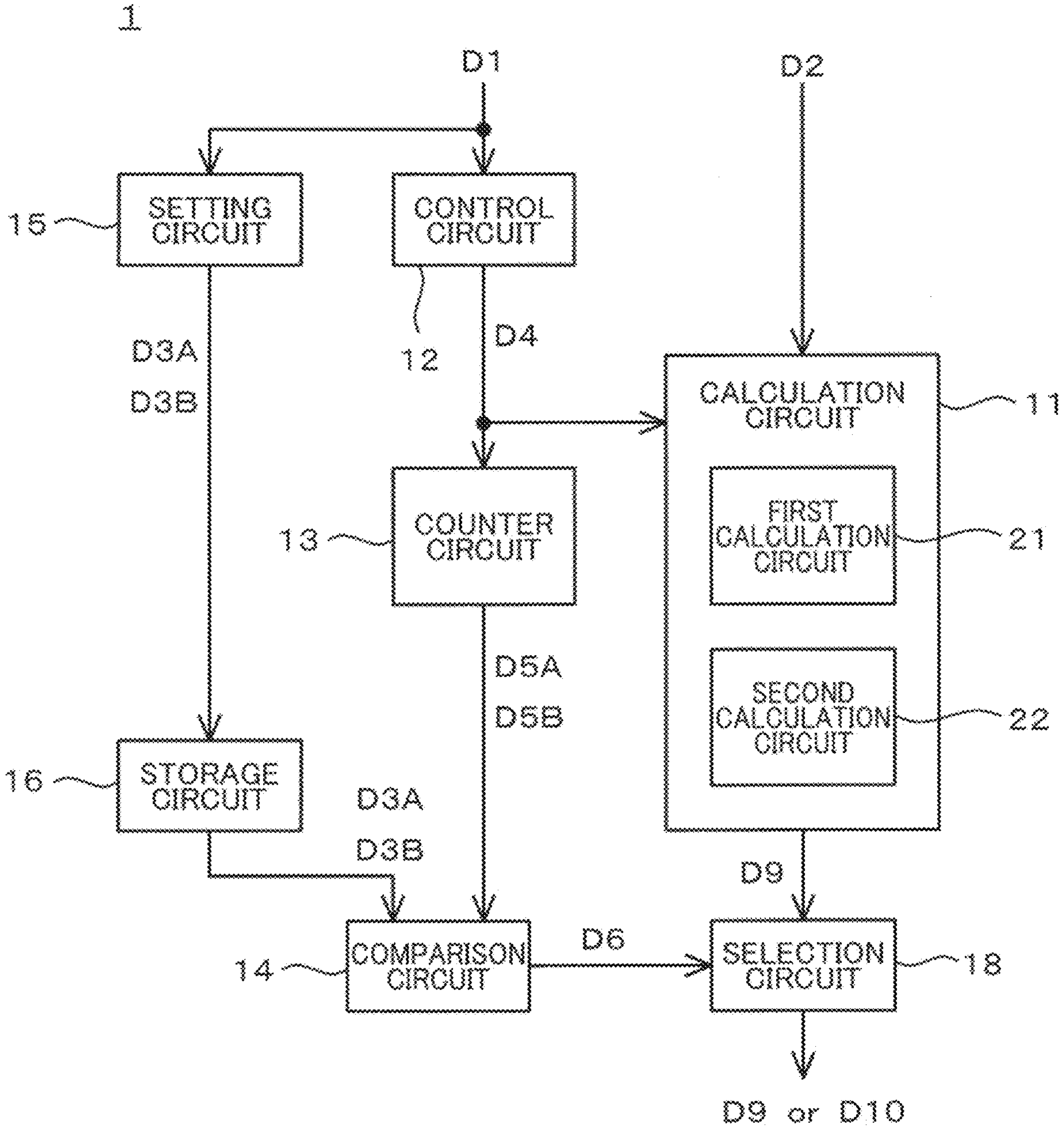
FIG. 7 is a diagram showing a simplified configuration of an information processing device according to a second modification.

FIG. 7 is a diagram showing a simplified configuration of an information processing device according to the second modification. A counter circuit 13 outputs a first counter value D5A and a second counter value D5B to each serve as the counter value D5. The first counter value D5A indicates a total number of processing target bits subjected to only the second calculation of the first calculation and the second calculation by a calculation circuit 11. The second counter value D5B indicates a total of weight values each associated with a bit position of each processing target bit subjected to only the second calculation of the first calculation and the second calculation by the calculation circuit 11.

A setting circuit 15 calculates a first expected value D3A and a second expected value D3B to each serve as an expected value D3. The first expected value D3A indicates a total number of bits each having the logic value of "0" among the bits constituting confidential information D1, and corresponds to an expected value for the first counter value D5A. The second expected value D3B indicates a total of weight values each associated with a bit position of each bit having the logic value of "0" among the bits constituting the confidential information D1, and corresponds to an expected value for the second counter value D5B.

A comparison circuit 14 compares the first expected value D3A with the first counter value D5A, and compares the second expected value D3B with the second counter value D5B. When the first expected value D3A agrees with the first counter value D5A and the second expected value D3B agrees with the second counter value D5B, the comparison circuit 14 outputs data D6 showing a result of comparison that no FA is detected. When the first expected value D3A disagrees with the first counter value D5A or the second expected value D3B disagrees with the second counter value D5B, the comparison circuit 14 outputs data D6 showing a result of detection that an FA is detected.

Even when the first counter value D5A agrees with the first expected value D3A in association with each bit position or the number of bits concerning an error injection, the modification enables detection of an FA with reference to a difference between the second counter value D5B and the second expected value D3B. Similarly, even when the second counter value D5B agrees with the second expected value DB3 in association with each bit position or the number of bits concerning an error injection, the modification enables detection of the FA with reference to a difference between the first counter value D5A and the first expected value D3A. As a result, the FA is detectable with higher accuracy.

Third Modification

A weight value may be "$2^n$" in the first modification or the second modification. Specifically, confidential information D1 is constituted by a plurality of k-bits with a $0^{th}$ bit defined as a least significant bit and a $(k-1)^{th}$ bit defined as a most significant bit. The weight value at a bit position of an $n^{th}$ bit may be $2^n$, "n" being an integer of 0 or more to (k−1) or less.

FIG. 8 is a table showing a simplified example setting of weight values. The weight values differ in association with a bit position of each processing target bit. For instance, a weight value of "$2^0$" is set for a $0^{th}$ bit (the least significant bit), and a weight value of "$2^1$" is set for a first bit, and a weight value of "$2^2$" for a second bit, the bits constituting confidential information D1.

A setting circuit 15 calculates, in accordance with a setting rule for weight values, an expected value D3 based on the confidential information D1. The expected value D3 indicates a total of weight values each associated with a bit position of each bit having the logic value of "0" among a plurality of bits constituting the confidential information D1.

The modification enables reliable detection of an FA by setting the weight value to $2^n$. Even when the number of processing target bits each having the logic value of "1" flipped from "0" due to an error injection equals to the number of processing target bits each having the logic value of "0" flipped from "1" due to an error injection, the modification enables reliable detection of the FA. Besides, the setting of the weight value to "$2^n$" leads to achievement in update of a counter value D5 by simply executing a circular left shift of the counter value D5 after flipping the value of the most significant bit in the counter value D5 in accordance with an input control signal D4 showing the logic value of "0" or a circular left shift of the counter value D5 without flipping the value of the most significant bit in the counter value D5 in accordance with an input control signal D4 showing the logical value of "1".

Fourth Modification

In the third modification, a counter circuit 13 may include a plurality of registers, and the counter circuit 13 may distribute and store the counter value D5 in the registers in emergence order of processing target bits subjected to only the second calculation of the first calculation and the second calculation by a calculation circuit 11.

Figure 9:
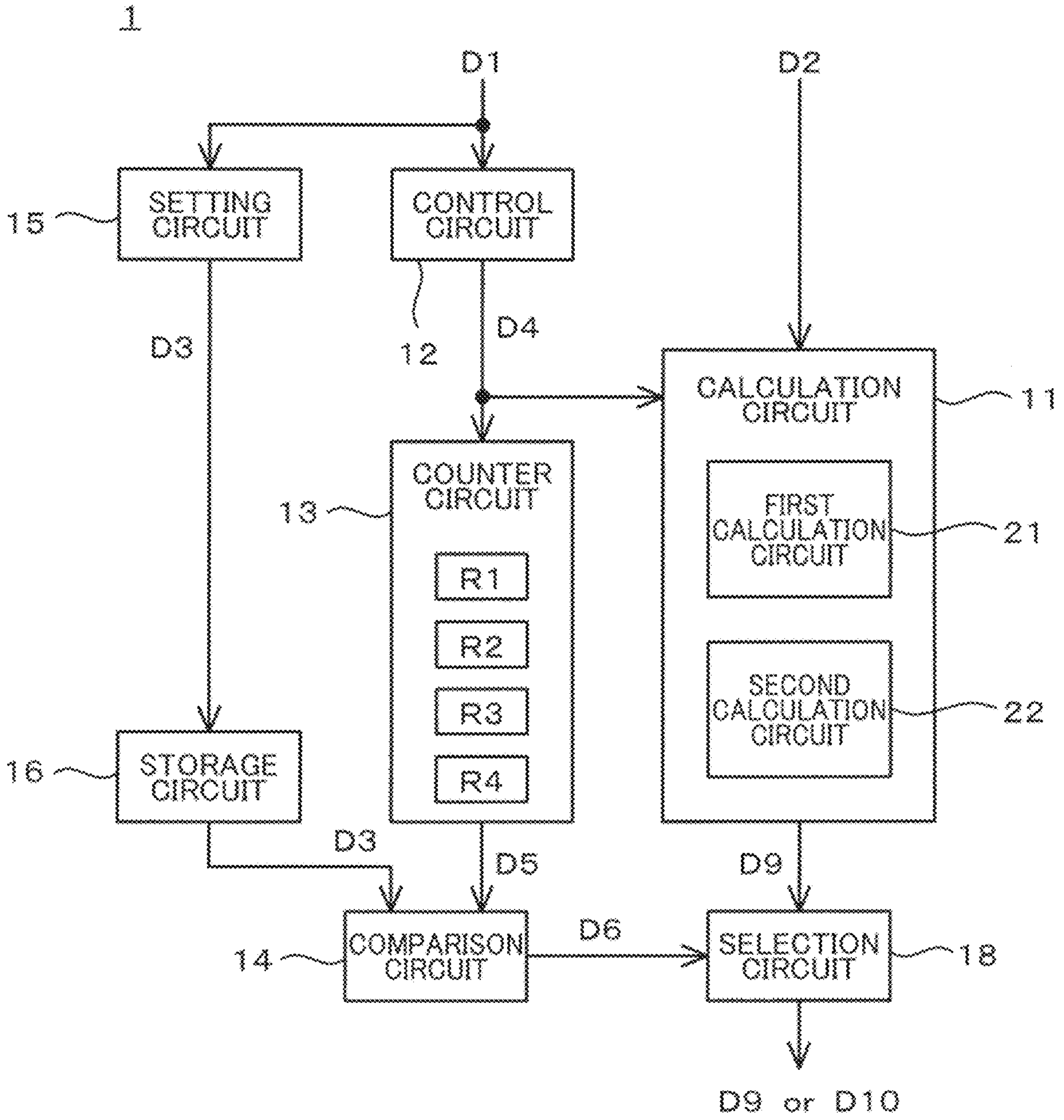
FIG. 9 is a diagram showing a simplified configuration of an information processing device according to a fourth modification.

FIG. 9 is a diagram showing a simplified configuration of an information processing device 1 according to the fourth modification. The counter circuit 13 includes a plurality of (four in the example shown in FIG. 9) registers R1 to R4.

Figure 10:
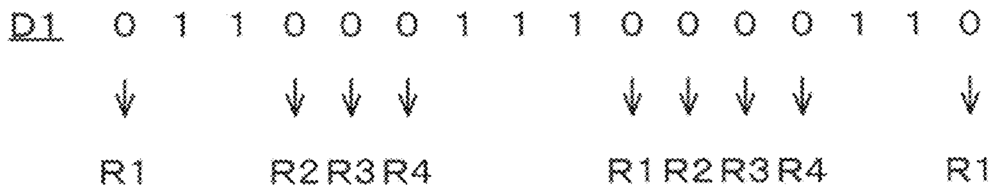
FIG. 10 is an illustration of simplified confidential information.

FIG. 10 is an illustration of simplified example confidential information D1. In the example illustrated in FIG. 10, the confidential information D1 has a bit array of "0110001110000110".

The counter circuit 13 updates a counter value of the register R1 in association with first emergence of "0", updates a counter value of the register R2 in association with second emergence of "0", updates a counter value of the register R3 in association with third emergence of "0", and updates a counter value of the register R4 in association with fourth emergence of "0", and repeats the execution of the update in this manner thereafter.

FIG. 11 is an illustration of simplified example counter values of the registers R1 to R4. A calculation circuit 11 executes only the second calculation of the first calculation and the second calculation in association with a bit position showing "0" in the confidential information D1, so that the counter value of any one of the registers R1 to R4 reaches "1" in accordance with the emergence order of processing target bits each having the value of "0".

The modification achieves a reduction in the amount of information in each of the registers R1 to R4 and prevention of leakage of the confidential information D1 from the counter circuit 13 by distributing and storing the counter value D5 in the registers R1 to R4.

Fifth Modification

For instance, in the third modification, an initial value for the counter value D5 may be randomly set with a random number. The fifth modification is applicable to the embodiment and other modifications.

Figure 12:
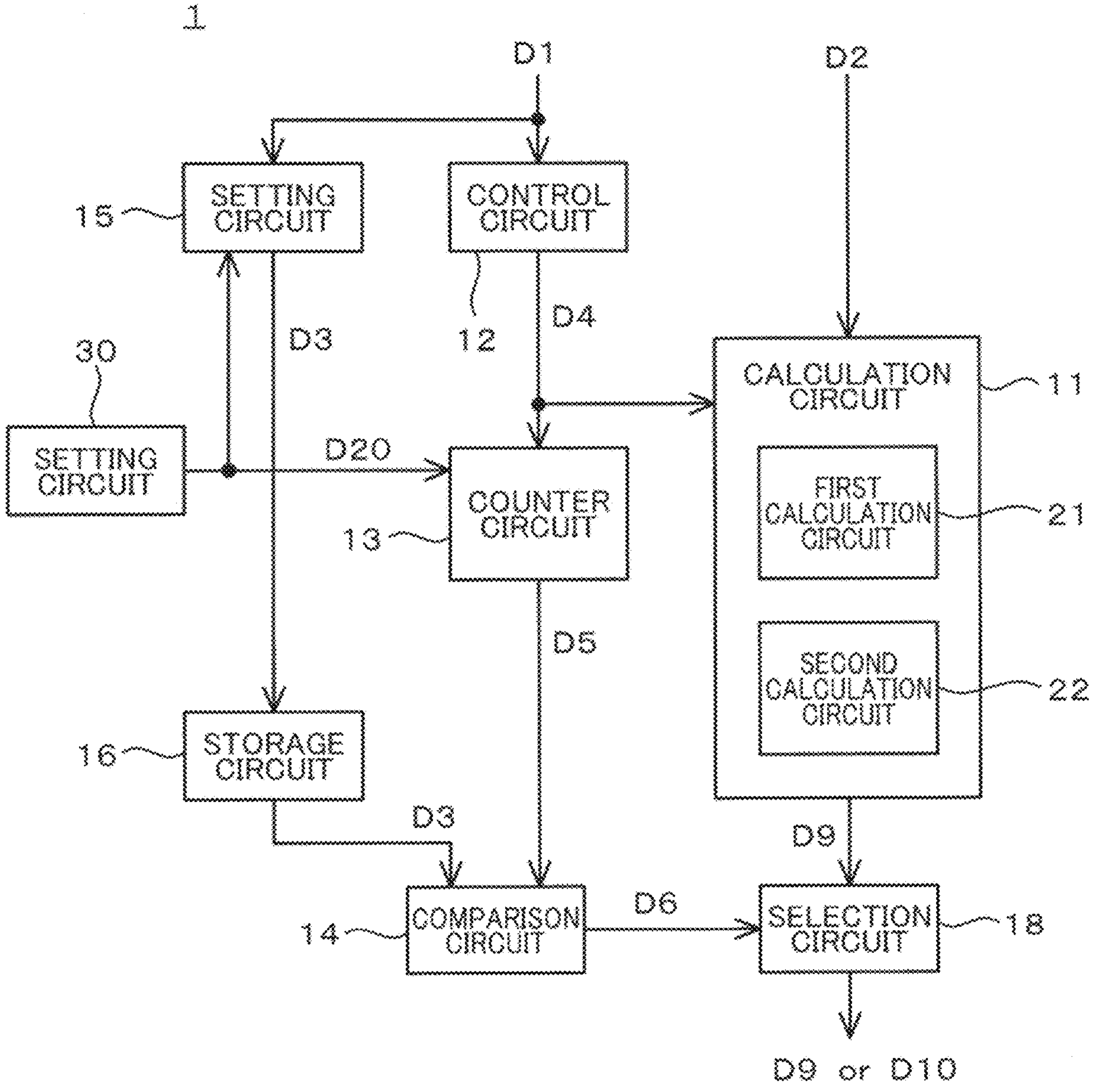
FIG. 12 is a diagram showing a simplified configuration of an information processing device according to a fifth modification.

FIG. 12 is a diagram showing a simplified configuration of an information processing device 1 according to the fifth modification. The information processing device 1 includes a setting circuit 30 that sets an initial value for a counter value D5 with a random member. The setting circuit 30 includes, for example, a pseudorandom number generation circuit. The setting circuit 30 generates and outputs an initial value 20 being a random number value. The initial value D20 is input into a counter circuit 13 and a setting circuit 15. In step S02 in the flowchart shown in each of FIG. 3 and FIG. 5, the setting circuit 15 sets an expected value D3 on the basis of confidential information D1 and the initial value D20. In step S04 in the flowchart shown in each of FIG. 3 and FIG. 5, the counter circuit 13 resets the counter value D5 to the initial value D20.

The modification enables concealment of the counter value D5 by setting the initial value D20 for the counter value D5 with the random number. As a result, the modification enables prevention of leakage of the confidential information D1 from the counter circuit 13. Further, the modification achieves this prevention at lower a cost than a cost incurring in a configuration of concealing the confidential information D1 itself with a random number.

Sixth Modification

In the embodiment, the counter circuit 13 may update the counter value D5 through a calculation by the first calculation circuit 21.

Figure 13:
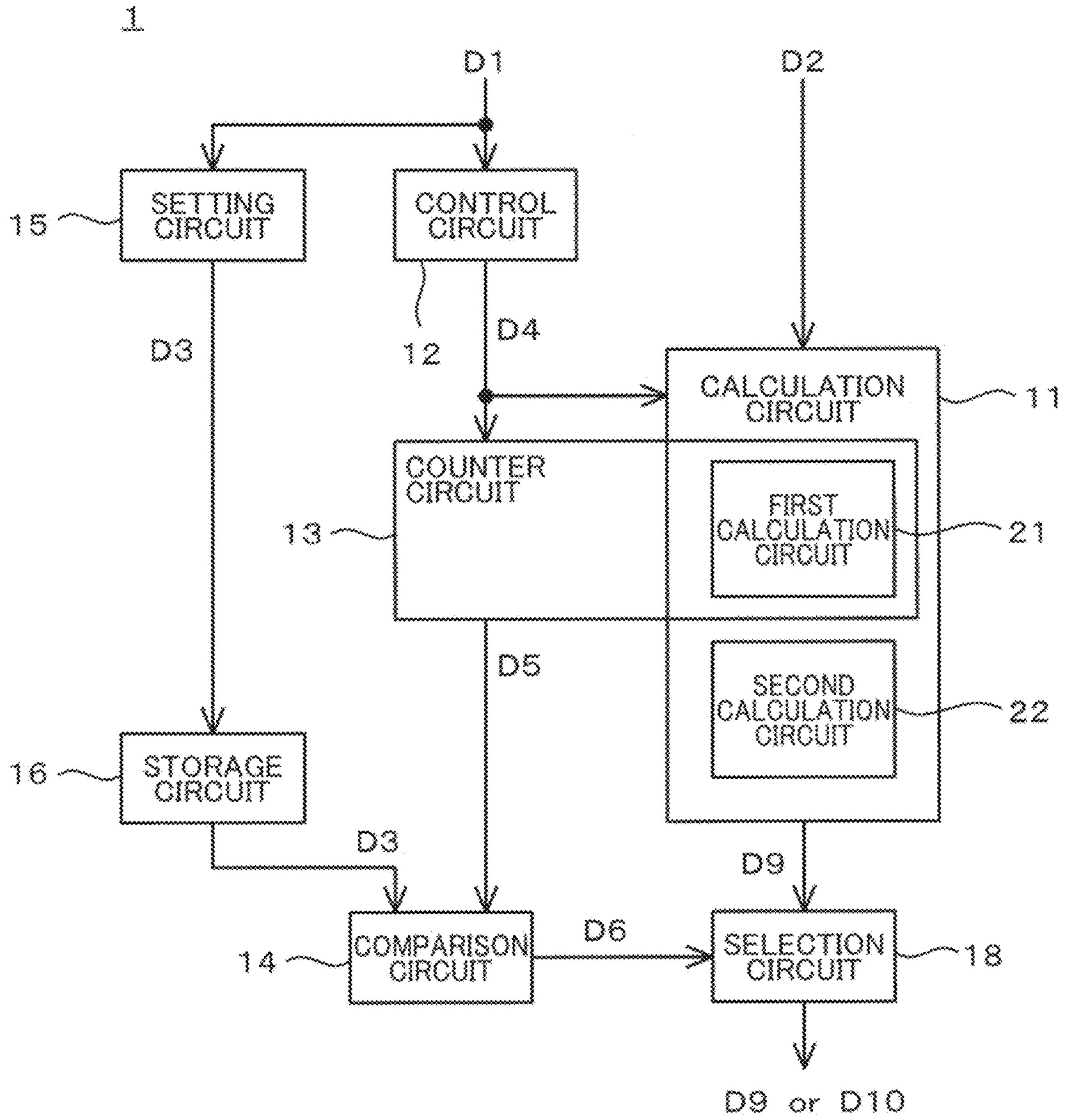
FIG. 13 is a diagram showing a simplified configuration of an information processing device according to a sixth modification.

FIG. 13 is a diagram showing a simplified configuration of an information processing device 1 according to the sixth modification. A counter circuit 13 is configured to involve a first calculation circuit 21 included in a calculation circuit 11, and updates a counter value D5 through a calculation by the first calculation circuit 21.

When the first calculation circuit 21 serves as a multiplication circuit 21A as shown in FIG. 2, the counter circuit 13 sets an initial value for the counter value D5 to "1". The counter circuit 13 multiplies "2" by a present counter value D5 by the multiplication circuit 21A for a processing target bit subjected to only the second calculation of the first calculation and the second calculation by the calculation circuit 11. In other words, one digit is added to the counter value D5 by a leftward bit shift of the counter value D5 by one bit. The comparison circuit 14 compares the number of digits of an expected value D3 based on the confidential information D1 with the final number of digits of the counter value D5. Such simple comparison of the number of digits of the expected value D3 with the number of digits of the counter value D5 enables detection of an FA.

When the first calculation circuit 21 serves as a point addition circuit 21B as shown in FIG. 4, the counter circuit 13 sets an initial value for the counter value D5 to a predetermined point coordinate on an elliptical curve. The counter circuit 13 executes a point addition calculation of adding a base point G to the present counter value D5 by the point addition circuit 21B for a processing target bit subjected to only the second calculation of the first calculation and the second calculation by the calculation circuit 11. The comparison circuit 14 compares a point coordinate of the expected value D3 calculated in advance on the basis of confidential information D1 with a final point coordinate of the counter value D5.

The modification enables execution of a calculation by the first calculation circuit 21 even when a processing target bit has the logic value of "0", and thus achieves resistance (SPA resistance) against a simple electric power analysis attack in addition to FA resistance.

The modification further enables detection of an FA by simply comparing the number of digits of the expected value D3 with the number of digits of the counter value D5.

The modification additionally enables detection of the FA by simply comparing the point coordinate of the expected value D3 with the point coordinate of the counter value D5.

Seventh Modification

In the sixth modification, a bit shift may have a shift width depending on the number of processes of processing target bits.

FIG. 14 is a table showing a simplified example setting of shift widths. The shift widths differ depending on the number of processes of processing target bits (i.e., in association with each bit position of each processing target bit). For instance, a shift width for the first process is set to one bit, a shift width for the second process is set to two bits, and a shift width for the third process is set to three bits.

In the sixth modification, a point calculation value may be set depending on the number of processes of the processing target bits.

FIG. 15 is a table showing a simplified example setting of point addition values. The point addition values differ depending on the number of processes of processing target bits (i.e., in accordance with each bit position of each processing target bit). For instance, a point addition value for the first process is set to 1G, a point addition value for the second time is set to 2G, and a point addition value for the third process is set to 3G.

Even when the number of processing target bits each having the logic value of "1" flipped from "0" due to an error injection equals to the number of processing target bits each having the logic value of "0" flipped from "1" due to an error injection, the modification achieves improvement in accuracy of detecting the FA.

Eighth Modification

In the sixth modification, a bit shift may have a shift width depending on the number of repetitions of a value of a processing target bit subjected to the first calculation and the second calculation by the calculation circuit 11 before processing target bits subjected to only the second calculation of the first calculation and the second calculation by the calculation circuit 11.

Figure 16:
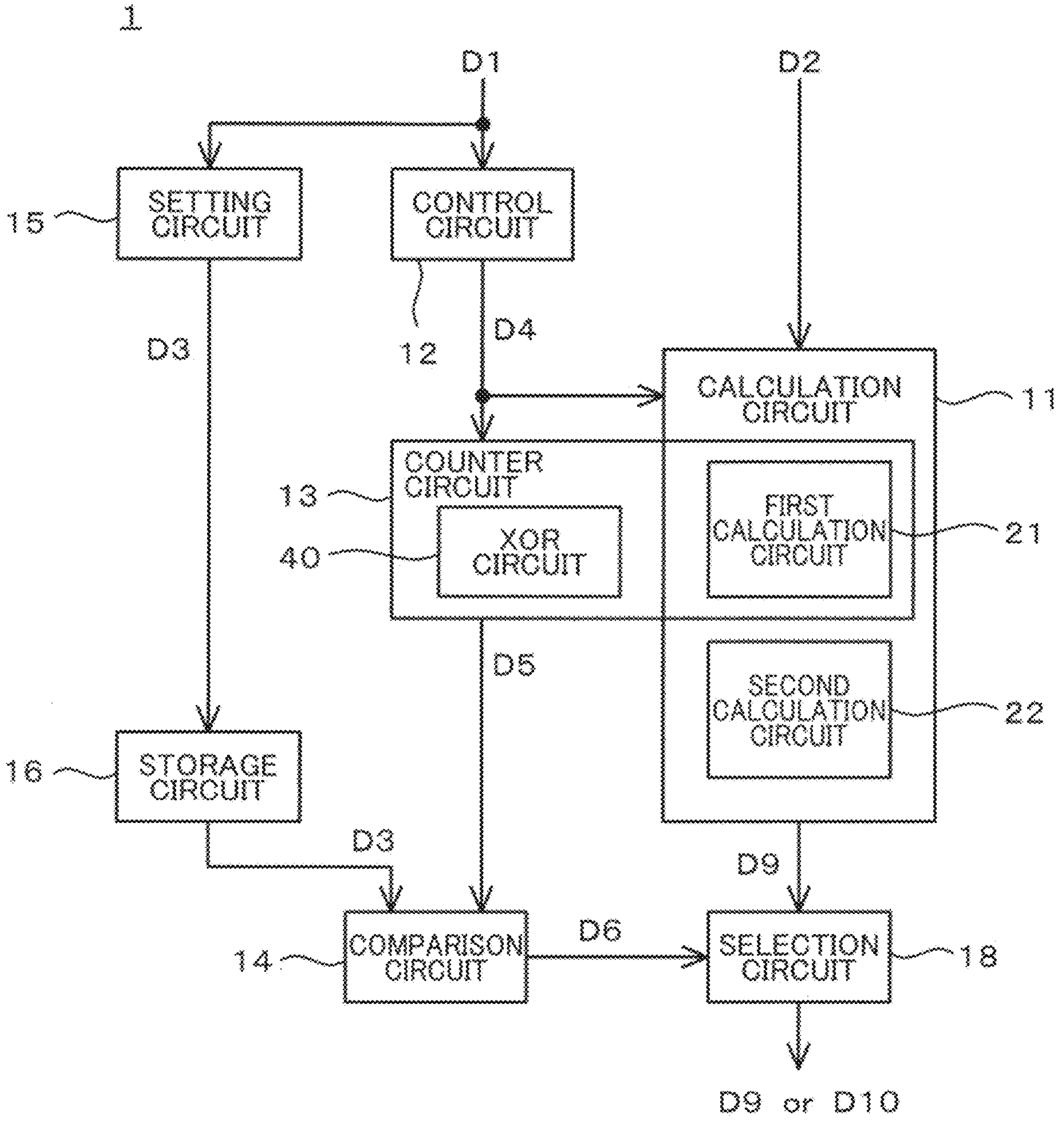
FIG. 16 is a diagram showing a simplified configuration of an information processing device according to an eighth modification.

FIG. 16 is a diagram showing a simplified configuration of an information processing device 1 according to the eighth modification. A counter circuit 13 includes an XOR circuit 40 that executes a calculation based on the exclusive-OR (XOR) way.

Figure 17A:
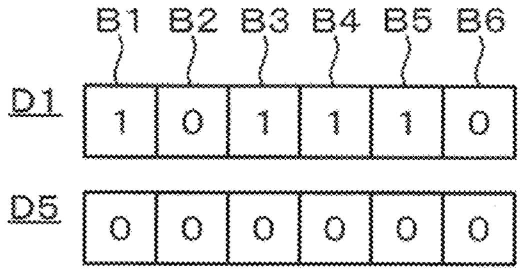
FIGS. 17A-17C includes illustrations each showing simplified update of a counter value by a counter circuit.
Figure 17B:
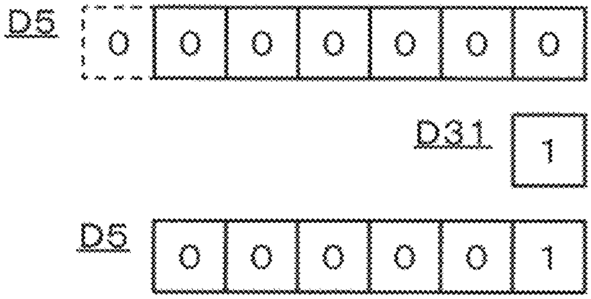
Figure 17C:
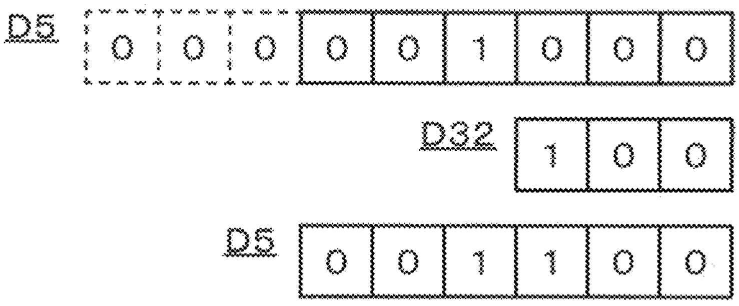

FIGS. 17A-17C includes illustrations each showing simplified update of a counter value D5 by the counter circuit 13.

As shown in FIG. 17A, confidential information includes data "101110" constituted by six bits of bits B1 to B6, and an initial value for a counter value D5 is set to "000000".

As shown in FIG. 17B, the counter circuit 13 counts the number of repetitions of the value of "1" immediately before the bit B2 at processing the bit B2 having the value of "0". In the example shown in FIG. 17A, the number of repetitions is recognized as "1" from the bit B1. The counter circuit 13 executes a leftward bit shift of a present counter value D5 by one bit in association with the number of repetitions "1". The counter circuit 13 generates data D31 "1" having one bit indicating the number of repetitions "1". The counter circuit 13 updates the counter value D5 by executing an XOR calculation by the XOR circuit 40 for the counter value D5 and the data D31 after the bit shift. The updated counter value D5 results in "000001".

As shown in FIG. 17C, the counter circuit 13 counts the number of repetitions of the value of "1" immediately before the bit B6 at the processing of the bit B6 having the value of "0". In the example shown in FIG. 17A, the number of repetitions is recognized as "3" from the bits B3 to B5. The counter circuit 13 execute a leftward bit shift of a present counter value D5 by three bits in association with the number of repetitions "3". The counter circuit 13 generates data D32 "100" having three bits indicating the number of repetitions "3". The counter circuit 13 updates the counter value D5 by executing an XOR calculation by the XOR circuit 40 for the counter value D5 and the data D32 after the bit shift. The updated counter value D5 results in "001100".

Even when the number of processing target bits each having the logic value of "1" flipped from "0" due to an error injection equals to the number of processing target bits each having the logic value of "0" flipped from "1" due to an error injection, the modification achieves improvement in accuracy of detecting the FA.

The function of each element disclosed here may be exerted by a circuit configuration or a processing circuit configuration including a versatile processor, a special processor, an integrated circuit, an application specific integrated circuit (ASIC), a conventional circuit configuration and/or a combination of them configured to execute the function of each element disclosed here or programed to execute the disclosed function. In a case where a processor includes a transistor and other circuit configurations therein, the processor may serve as a processing circuit configuration or a circuit configuration. In the disclosure, a circuit configuration, a unit, or other way serves as hardware to execute the described functions, or hardware programmed to execute the functions. The hardware may be any hardware disclosed above or any known hardware programed to execute the described functions or configured to execute the functions. In a case where hardware includes a processor which may be regarded as a certain type of circuit configuration, a circuit configuration, a way, or a unit may serve as a combination of hardware and software, or may serve as software and/or processor for constituting the hardware.

This application is based on Japanese Patent application No. 2024-039276 filed in Japan Patent Office on Mar. 13, 2024, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. An information processing device, comprising:

a calculation circuit that includes a first calculation circuit and a second calculation circuit;

a control circuit;

a counter circuit; and a comparison circuit, wherein the control circuit executes;

processing a plurality of bits constituting confidential information one after another, each of the bits being a processing target bit;

causing the calculation circuit to execute a first calculation by the first calculation circuit and a second calculation by the second calculation circuit when the processing target bit has a logic value of "1"; and causing the calculation circuit to execute only the second calculation of the first calculation and the second calculation when the processing target bit has a logic value of "0", the counter circuit outputs a counter value based on the number of processing target bits subjected to only the second calculation of the first calculation and the second calculation by the calculation circuit, and the comparison circuit compares the counter value with an expected value for the counter value based on the confidential information.

2. The information processing device according to claim 1, wherein the calculation circuit serves as a modular exponentiation calculation circuit, the first calculation circuit serves as a multiplication circuit, and the second calculation circuit serves as a squared calculation circuit.

3. The information processing device according to claim 1, wherein the calculation circuit serves as a scalar multiplication circuit defined on the basis of an elliptic curve, the first calculation circuit serves as a point addition circuit, and the second calculation circuit serves as a point doubling circuit.

4. The information processing device according to claim 1, wherein the first calculation circuit and the second calculation circuit are commonly constituted by the calculation circuit configured to selectively execute the first calculation and the second calculation by switching therebetween.

5. The information processing device according to claim 1, wherein the counter value indicates a total number of processing target bits subjected to only the second calculation of the first calculation and the second calculation by the calculation circuit.

6. The information processing device according to claim 1, wherein the counter value indicates a total of weight values each associated with a bit position of each of the processing target bits subjected to only the second calculation of the first calculation and the second calculation by the calculation circuit.

7. The information processing device according to claim 1, wherein the counter value includes;

a first counter value indicating a total number of processing target bits subjected to only the second calculation of the first calculation and the second calculation by the calculation circuit; and a second counter value indicating a total of weight values each associated with a bit position of each of the processing target bits subjected to only the second calculation of the first calculation and the second calculation by the calculation circuit.

8. The information processing device according to claim 6, wherein the bits include k-bits with a $0^{th}$ bit defined as a least significant bit and a $(k-1)^{th}$ bit defined as a most significant bit, and a weight value at a bit position of an $n^{th}$ bit is $2^n$, "n" being an integer of 0 or more to (k−1) or less.

9. The information processing device according to claim 8, wherein the counter circuit includes a plurality of registers, and the counter circuit distributes and stores the counter value in the registers in emergence order of the processing target bits subjected to only the second calculation of the first calculation and the second calculation by the calculation circuit.

10. The information processing device according to claim 8, further comprising a setting circuit that sets an initial value for the counter value with a random number.

11. The information processing device according to claim 7, wherein the bits include k-bits with a $0^{th}$ bit defined as a least significant bit and a $(k-1)^{th}$ bit defined as a most significant bit, and a weight value at a bit position of an n-th bit is $2^n$, "n" being an integer of 0 or more to (k−1) or less.

12. The information processing device according to claim 11, wherein the counter circuit includes a plurality of registers, and the counter circuit distributes and stores the counter value in the registers in emergence order of the processing target bits subjected to only the second calculation of the first calculation and the second calculation by the calculation circuit.

13. The information processing device according to claim 11, further comprising a setting circuit that sets an initial value for the counter value with a random number.

14. The information processing device according to claim 1, wherein the counter circuit updates the counter value through a calculation by the first calculation circuit.

15. The information processing device according to claim 14, wherein the counter circuit executes a bit shift of the counter value when the calculation circuit executes only the second calculation of the first calculation and the second calculation, and the counter value indicates a total number of the bit shift.

16. The information processing device according to claim 15, wherein the bit shift has a shift width depending on the number of times of the processing target bits have been processed.

17. The information processing device according to claim 15, wherein the bit shift has a shift width depending on the number of repetitions of the value of the processing target bit subjected to the first calculation and the second calculation by the calculation circuit before the processing target bits subjected to only the second calculation of the first calculation and the second calculation by the calculation circuit.

18. The information processing device according to claim 14, wherein the counter circuit executes a point addition calculation of adding the counter value when the calculation circuit executes only the second calculation of the first calculation and the second calculation, and the counter value indicates coordinate of a point.

19. The information processing device according to claim 18, wherein the number of point addition calculations depends on the number of times of the processing target bits have been processed.

20. An information processing method, comprising:

by an information processing device, acquiring confidential information constituted by a plurality of bits;

processing the bits one after another, each of the bits being a processing target bit;

executing a first calculation and a second calculation when the processing target bit has a logic value of "1";

executing only the second calculation of the first calculation and the second calculation when the processing target bit has a logic value of "0";

counting a counter value based on the number of processing target bits subjected to only the second calculation of the first calculation and the second calculation; and comparing the counter value with an expected value for the counter value based on the confidential information.

* * * * *